United States Patent
Etesse et al.

(10) Patent No.: US 8,540,928 B2
(45) Date of Patent: Sep. 24, 2013

(54) PROCESS FOR THE MANUFACTURE OF CONTAINERS WHICH HAVE AN INTEGRAL HANDLE, AND CONTAINERS MANUFACTURED THEREBY

(75) Inventors: Patrick Jean-Francois Etesse, Etterbeek (BE); William John Cleveland Connolly, Windlesham (GB)

(73) Assignee: The Procter & Gamble Company, Cincinnati, OH (US)

( * ) Notice: Subject to any disclaimer, the term of this patent is extended or adjusted under 35 U.S.C. 154(b) by 676 days.

(21) Appl. No.: 11/346,959

(22) Filed: Feb. 3, 2006

(65) Prior Publication Data

US 2006/0186581 A1  Aug. 24, 2006

(30) Foreign Application Priority Data

Feb. 4, 2005 (EP) .................................. 05075290

(51) Int. Cl.
 B29C 49/00 (2006.01)
 B29C 49/12 (2006.01)
 B29C 49/16 (2006.01)
 B29C 49/30 (2006.01)
 B29D 22/00 (2006.01)

(52) U.S. Cl.
 USPC ........... 264/529; 264/531; 264/532; 264/534; 425/525

(58) Field of Classification Search
 USPC ................................. 264/531, 532
 See application file for complete search history.

(56) References Cited

U.S. PATENT DOCUMENTS

| 3,983,199 A * | 9/1976 | Uhlig ............................ 264/520 |
| 4,421,711 A * | 12/1983 | Bonnebat et al. ............. 264/529 |
| 5,108,009 A * | 4/1992 | Davidson et al. ............. 222/109 |
| 5,275,780 A * | 1/1994 | Robinson ...................... 264/529 |
| 5,543,107 A * | 8/1996 | Malik et al. ................... 264/529 |
| 6,277,321 B1 * | 8/2001 | Vailliencourt et al. ........ 264/529 |
| 6,733,716 B2 | 5/2004 | Belcher |
| 7,153,455 B2 * | 12/2006 | Belcher ...................... 264/37.31 |
| 2002/0171161 A1 * | 11/2002 | Belcher ....................... 264/37.3 |
| 2006/0177615 A1 * | 8/2006 | Etesse et al. .................. 264/531 |

FOREIGN PATENT DOCUMENTS

EP 0346 518 A 12/1989

OTHER PUBLICATIONS

PCT International Search Report, 4 pages, Mailed May 24, 2006.

* cited by examiner

*Primary Examiner* — Benjamin Schiffman
(74) *Attorney, Agent, or Firm* — Gary J. Foose; Mark A. Charles

(57) ABSTRACT

A process for blow-molding a container, the container comprising a handle, whereby the process comprises the steps of:
(i) introducing a preform (2) into a mold cavity and stretching the preform (2) with a stretch rod;
(ii) increasing the pressure within the preform (2) so that the preform (2) expands within the mold cavity in a first blowing step, the pressure in the first blowing step is from 1 to 10 bar;
(iii) inwardly moving jaws (3, 4) within the mold cavity so that the expanding preform (2) is partially gripped between the jaws in the handle region;
(iv) subsequently increasing the pressure within the preform (2) wherein the maximum pressure in the second blowing step is greater than 10 bar, so that the preform (2) expands to the limits of the mold cavity in a second blowing step to form a container;
and wherein the inward movement of the jaws (3, 4) is completed within the first blowing step.

10 Claims, 3 Drawing Sheets

PROCESS FOR THE MANUFACTURE OF CONTAINERS WHICH HAVE AN INTEGRAL HANDLE, AND CONTAINERS MANUFACTURED THEREBY

The present invention relates to a process for the manufacture of containers which have an integral handle. The process is particularly suitable for the manufacture of transparent, handled containers made from plastic materials. An example of a suitable transparent plastic material is polypropylene. The present invention further relates to containers comprising a hollow handle which are made from bi-oriented polypropylene.

Polypropylene is known in the art as a suitable material from which to manufacture transparent containers. Conventionally, an extrusion blow-molding process has been used, but such a process, although capable of producing integral handles, results in bottles with low clarity and impact strength.

U.S. Pat. No. 6,733,716, issued on May 11, 2004, discloses a process of stretching a polyethylene terephthalate (PET) preform with a stretch rod; blowing the preform into the shape of a bottle in the mold; discharging blow gas from the stretch rod onto an interior wall surface where the handle is to be formed; and advancing movable mold segments within the blow-mold from a first retracted position to a second position thereby compressing an interior wall surface of the article into contact with a facing interior wall surface of the bottle to bond the surfaces at an elevated temperature and form an integral handle extending from the exterior wall of the blow-molded article.

However, this prior art process of completing the pre-blow to form the container shape before utilising the moving mold segments will result in either extensive material over-stretching at the handle area, or require the use of significantly thicker-walled preforms, and resulting bottles, than is optimum. In addition, due to the surface characteristics of PET and the difference between its melt and blow temperature, PET is not suited to bonding to itself. Therefore, trimming off the bonded section whilst retaining liquid-tightness at the handle becomes unfeasible.

The need remains for an economical process for the manufacture of a transparent container which comprises an integral handle.

SUMMARY OF THE INVENTION

The present invention relates to a process for blow-molding a container whereby in a first blowing step the pressure within the preform is increased in the range of from 1 to 10 bar within the mold cavity so that the preform expands within the mold cavity and, in the same first blowing step, the expanding preform is partially gripped, and preferably fused, between inwardly moving jaws in the handle region; and, subsequently, in a second blowing step, increasing the pressure to greater than 10 bar within the preform so that the preform expands to the limits of the mold cavity to form a container.

DETAILED DESCRIPTION OF THE INVENTION

Figure 1:
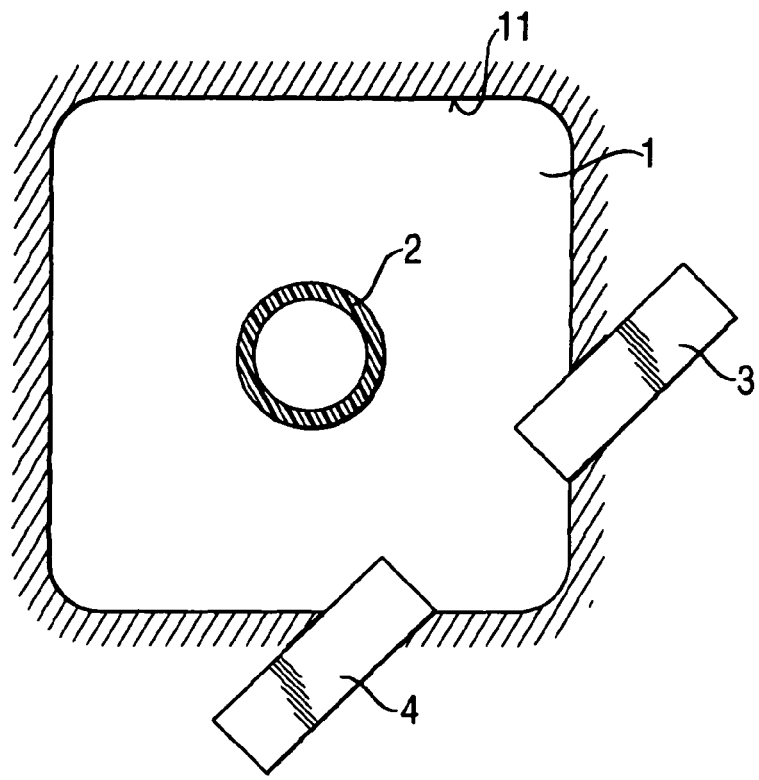
FIG. 1 shows, diagrammatically, a cross-section through the mold cavity with the preform inserted, before the first blowing step.

Transparent containers, such as bottles, are highly desirable packages for consumer goods such as drinks, foodstuffs, laundry and household cleaning products, shampoo and other personal care products.

It is also desirable that relatively large packages, for example 2 liters and above, should be provided with a handle so that the consumer can conveniently lift the product and pour from the package even when the package is full.

The former of these objectives, the transparent container, has been realized with various thermoplastic materials, but most commonly with polyethylene terephthalate (PET), and most commonly manufactured in an injection stretch blow-molding process.

The latter of these objectives, the container with a handle, has also been realized with various thermoplastic materials including polyethylene and polypropylene, and most commonly manufactured in an extrusion blow-molding process. In such a process polyethylene and polypropylene containers are blown, and the flow properties of these thermoplastic materials are such that the material flows around a fixed insert within the mold cavity thus forming the handle. Containers made by extrusion blow-molding of polyethylene and polypropylene exhibit low clarity, and low impact strength.

The present invention relates to an injection stretch blow-molding process which is adapted to provide a container with a handle. Moreover the present invention makes use of polypropylene which, after the injection stretch blow-molding process, becomes bi-oriented. The resulting bi-oriented polypropylene exhibits good clarity, which is to say that it is essentially "transparent".

A "mold" as described herein generally comprises two or more parts which can be closed to form a "mold cavity", and opened in order to allow a preform to be inserted into the mold and/or the blown product to be removed from the mold. In commercial operations multiple mold cavities may be combined in a continuous, high-speed machine.

By "preform" what is meant herein is a molded form which is produced prior to expansion to form the finished object. A preform is necessarily somewhat smaller than the finished object. A preform is generally produced by, for example injection molding, at an elevated temperature in excess of the melt temperature. The appropriate stretch temperature for a polypropylene is between about 140° C. and 150° C.

By "stretch blow-molding" what is meant herein is a process in which the preform is first stretched longitudinally, generally by means of a stretch pin or plunger, followed by a blowing step at a temperature above the glass transition temperature, designed to result in retained orientation in the blow direction so that the resulting configuration is "biaxially oriented". The stretch blow-molding process of the present invention comprises two steps: a first blowing step, and, preferably following immediately afterwards, a second blowing step. In the first blowing step inwardly moving jaws within the mold cavity partially grip the expanding preform. In a preferred embodiment of the invention the inwardly moving jaws grip and fuse the expanding preform. The inward movement of the jaws is completed within the first blowing step. The pressure applied within the preform during the first blowing step is from 1 to 10 bar, preferably from 3 to 8 bar. Thereafter the pressure applied within the preform is increased in the second blowing step. In the second blowing step the pressure is greater than 10 bar, preferably maximum pressure is from 12 to 20 bar.

In a preferred further step the completed bottle is then ejected from the mold, and the welded handle section which has been formed by fusing together of plastic material between the moving jaws is removed to create a full through handle.

Polypropylene is readily available in commercial grades. Materials having suitable combinations of melt strength, re-heat properties, clarity and processing window size are available from suppliers such as Borealis, BP, and Total, e.g. Total's PPR7225. The use of such materials can enable injection stretch blow-molding of polypropylene, and when allied to polypropylene's capability to weld at temperatures close to those required for blow-molding makes in-mold pinch-welding a viable process, unlike when PET is employed. Additionally, as polypropylene does not significantly strain harden at specific stretch ratios as PET does, the variation in stretch that will necessarily occur throughout the bottle due to the complexity of a handle section is of less concern.

Recent developments in materials and processing of polypropylene, moreover, have resulted in improvements in its suitability for injection stretch blow-molding, in a large-scale, economically viable process. Polymers having suitable combinations of melt strength, re-heat properties, clarity and processing window size have been developed, alongside equipment improvements, such that injection stretch blow-molded polypropylene bottles can be produced on high speed equipment with outputs in excess of 1,000 bottles/cavity/hour. The advantage of injection stretch blow-molding for polypropylene bottles is excellent clarity and gloss, along with improved impact strength, however, standard injection stretch blow-molding processes do not allow the production of an integral handle.

The process of the present invention provides a blow-molded container comprising a main bottle cavity and an integrally molded, hollow handle cavity, and wherein the main bottle cavity and the hollow handle cavity are interconnected such that fluid can flow freely between the two cavities The blow-molded container comprises bi-orientated polypropylene.

The blow-molded container comprises either a hollow handle having two opposing ends, and both of the ends are interconnected to the main cavity body of the container in such a way that fluid can freely flow between the hollow handle and the main cavity body through either or both of the ends of the hollow handle or alternatively, the blow-molded container comprises a hollow handle having two opposing ends, one of the ends is interconnected to the main cavity body of the container, and the other end is closed. Fluid can freely flow between the hollow handle and the main cavity body only through one of the ends of the hollow handle. Such a container is sometimes referred to as having an "open handle".

For commercially useful executions the blow-molded container will typically be decorated, for example by means of a label or sleeve. Examples of labels are wrap-around, wet-glue, and in-mold labels. Examples of sleeves are stretch sleeves and shrink sleeves. While any type of decoration can, in principle be applied to the first or second embodiments of the invention, a wrap-around label is particularly well-suited to the first embodiment, and a sleeve, more preferably a shrink-sleeve, is particularly well-suited to the open handle bottle of the second embodiment. One particular method of sleeving an open handle bottle is described in EP-A-1 238 916, published on 11 Sep. 2002, incorporated herein by reference.

It is preferred that the label or sleeve comprises a film substrate which is made from a transparent material. This enables decoration, i.e. brand name, logo, images, and the like; ingredient information; usage instructions; bar code; hologram etc., to be displayed for the consumer, whilst still preserving the aesthetic benefits of the transparent container. Such decoration is printed onto the film substrate by any of various techniques known in the packaging art.

In a particularly advantageous embodiment of the invention the label or sleeve comprises a film substrate which is polypropylene. Material recycling is greatly facilitated, and is therefore more economically viable, because both the bottle material and the film substrate are made from polypropylene, and there is no need to separate them into separate recycling streams. Furthermore, if any additional elements are fitted to the bottle, such as a collar or closure, it is preferred that these additional elements are also made from polypropylene for the same reason. The container, together with any collar, closure, label, sleeve and additional elements make up a finished product package. Preferably, the finished product package comprises at least 95% by weight of polypropylene.

Optionally, the blow-molded container may be capped with a one piece or two piece self draining closure. Self draining containers are known in the art. These containers include means for returning contents which have dripped or run down the exterior of the pouring spout to the main body of the container. Examples of prior art self draining closures are shown in U.S. Pat. No. 4,550,864 and U.S. Pat. No. 4,640,855.

In a particularly advantageous embodiment of the invention, the self draining spout is an integral part of the container. This can be achieved by injecting the self-draining spout as part of the preform so that the blown container ends up being a one piece self-draining container as in U.S. Pat. No. 5,114,659.

A preferred embodiment of the invention is described in more detail hereinbelow with reference to the drawings.

In FIG. 1, a conventional preform (2) is introduced into a mold cavity (1). The conventional preform (2) may be fabricated by any known technique including injection molding, extrusion blow-molding or compression molding, and is preferably made from a specialist ISBM grade of polypropylene. This preform (2) is either re-heated to the appropriate molding temperature of approximately 110-150° C., or is already at this temperature after cooling from the injection-molding step of a 1-stage ISBM machine. This preform (2) is inserted into the mold cavity (1) and the mold cavity (1) is closed. A stretch rod is then introduced into the hot preform (2) and used to longitudinally stretch the material. At or before the point when the rod contacts the base of the preform (2), high pressure blow-gas at approximately 5 to 10 Bar is applied to the inside of the preform (2), forcing the preform (2) to expand into the vented mold cavity (1). The mold cavity (1) contains two movable mold jaws (3, 4), which are initially retracted.

Figure 2:
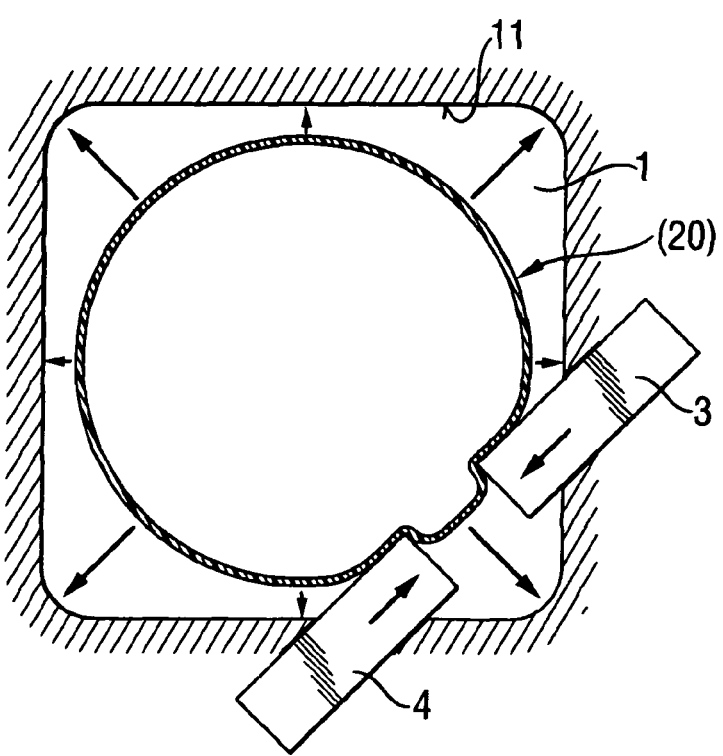
FIG. 2 shows the same view as FIG. 1 during the first blowing step.

In FIG. 2, the preform expands and its walls thin, the movable mold segments (3, 4) are moved inwardly within the mold, compressing a section of the expanding pre-form. As the additional stretching that is required to create the pinched areas occurs whilst the bottle is not fully stretched, this reduces the disparity in wall thickness between these areas and others in the final part. In a preferred embodiment the movable mold jaws will have heated tips to increase welding between the bottle walls on contact, and although the sides of these sections are warm to allow some equalisation of the wall thickness, they are at a temperature below the melt temperature of the material, so significant material freezing occurs on contact. This not only further improves wall thickness stability, but in some cases allows the handle area to be thicker than the main bottle walls, creating a reinforced section. In addition, areas of low friction material or finish can be applied to the mold inner, such for material to flow across the mold surface, maximising the wall thickness distribution stability.

Figure 3:
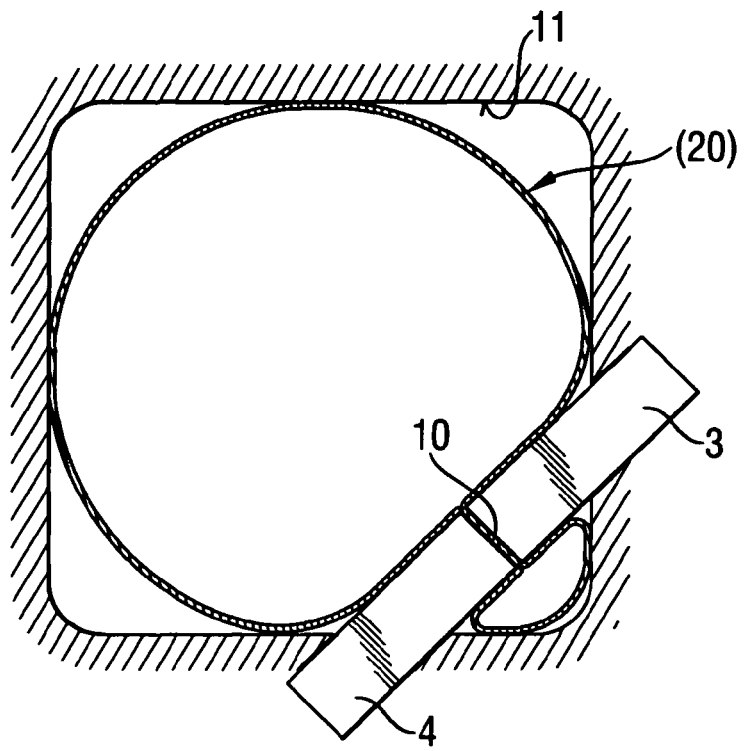
FIG. 3 shows the same view as FIG. 1 at the end of the first blowing step.
Figure 4:
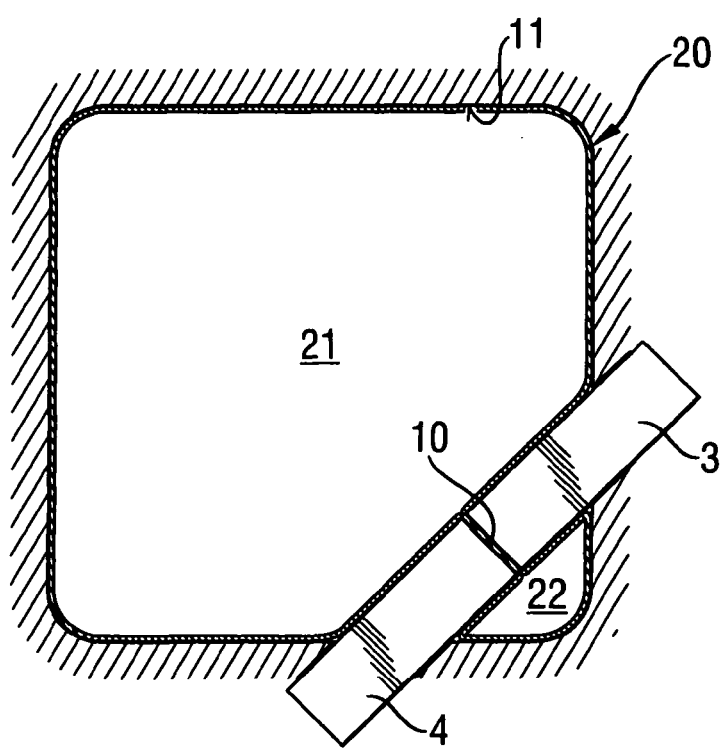
FIG. 4 shows the same view as FIG. 1 at the end of the second blowing step.

In FIG. 3, the stretching preform material begins to contact the mold walls (11), the movable jaws (3, 4) will have fully closed around the preform material, and a weld (10) initiated. Additional blow gas is then added to the inside of the bottle to increase the internal pressure to approx 10 to 20 Bar. In FIG. 4, this forces full intimate contact between the preform material and the mold walls, freezing off, and forming any surface finish or decorative detail that is present, thus forming the container (20).

The container (20) is then ejected from the mold (1). If required, an additional welding step is carried out using direct heat, indirect infra-red, sonic welding or any other standard method, and this section removed, via a range of possible techniques including mechanical stamping, laser cutting or hot stamping.

In the particular preferred embodiment illustrated in FIGS. 1 to 4, a container of approximately square cross section is utilised, where the handle is formed across a corner at 45° to an edge. This design creates a compromise between the contrasting requirements of a cross section closest to circular for ease of bottle blowing, and a section of close parallel walls for pinching and handle forming.

Figure 5:
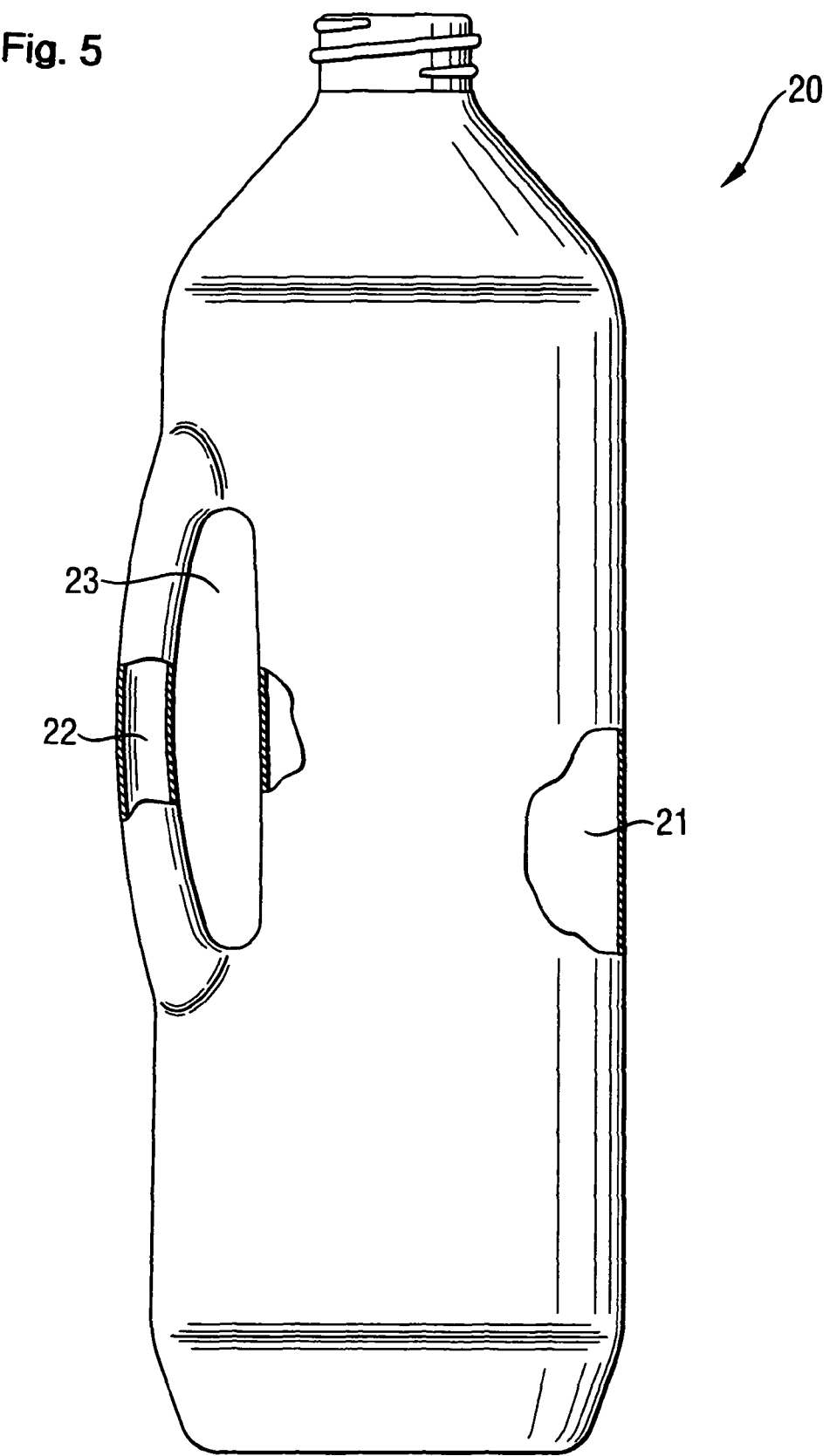
FIG. 5 shows a side view, with cut-away sections, of a container made according to the present invention.

FIG. 5 shows a side view of a bottle (20) made according to the present invention. The bottle comprises a main bottle cavity (21) and a hollow handle cavity (22). The material fused together between the moveable jaws has been removed to form the finished handle (23).

All documents cited in the Detailed Description of the Invention are, in relevant part, incorporated herein by reference; the citation of any document is not to be construed as an admission that it is prior art with respect to the present invention. To the extend that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for blow-molding a container, the container comprising a handle, whereby the process comprises the steps of:
  (i) introducing a preform into a mold cavity, closing the mold cavity, and stretching the preform with a stretch rod;
  (ii) increasing the pressure within the preform so that the preform expands within the mold cavity in a first blowing step;
  (iii) inwardly moving jaws within the mold cavity to make a handle;
  (iv) increasing the pressure within the preform so that the preform expands to the limits of the mold cavity in a second blowing step to form a container;
  wherein the inward movement of the jaws is completed within the first blowing step prior to full contact between the preform and the mold cavity and prior to the second blowing step, the pressure in the first blowing step is from about 1 to about 10 bar, and the maximum pressure in the second blowing step is greater than about 10 bar and wherein the container is transparent.

2. A process according to claim 1, wherein the pressure within the preform during the time in which the inwardly moving jaws are closed is from about 3 to about 8 bar.

3. A process according to claim 1, wherein the maximum pressure in the second blowing step is from about 12 to about 20 bar.

4. A process according to claim 1 wherein the preform is made from polypropylene and the container is made from bi-oriented polypropylene.

5. A process according to claim 1 wherein the container comprises a one piece or two piece self draining enclosure.

6. A process for blow-molding a container, the container comprising a handle, whereby the process comprises the steps of:
  (i) introducing a preform into a mold cavity, closing the mold cavity, and stretching the preform with a stretch rod;
  (ii) increasing the pressure within the preform so that the preform expands within the mold cavity in a first blowing step;
  (iii) inwardly moving jaws within the mold cavity so that the preform is partially gripped and fused between the jaws in the handle region prior to full contact between the preform and the mold cavity and prior to a second blowing step;
  (iv) subsequently increasing the pressure within the preform so that the preform expands to the limits of the mold cavity in the second blowing step to form a container;
  wherein the inward movement of the jaws is complete within the first blowing step, the pressure in the first blowing step is from about 1 to about 10 bar, and the maximum pressure in the second blowing step is greater than about 10 bar wherein the container is transparent.

7. A process according to claim 6, wherein the pressure within the preform during the time in which the inwardly moving jaws are closed is from about 3 to about 8 bar.

8. A process according to claim 6, wherein the maximum pressure in the second blowing step is from about 12 to about 20 bar.

9. A process according to claim 6, wherein the preform is made from polypropylene and the container is made from bi-oriented polypropylene.

10. A process according to claim 6 wherein the container comprises a one piece or two piece self draining enclosure.

* * * * *